No. 628,904.  W. EDSON.  Patented July 11, 1899.
SHAKER ATTACHMENT FOR TUMBLERS, &c.
(Application filed May 22, 1899.)
(No Model.)

WITNESSES
Frank H. Parker,
Anna C. Kingsbury

INVENTOR
William Edson

UNITED STATES PATENT OFFICE.

WILLIAM EDSON, OF BOSTON, MASSACHUSETTS, ASSIGNOR TO ALBERT G. SMALLEY, OF CHELSEA, MASSACHUSETTS.

SHAKER ATTACHMENT FOR TUMBLERS, &c.

SPECIFICATION forming part of Letters Patent No. 628,904, dated July 11, 1899.

Application filed May 22, 1899. Serial No. 717,835. (No model.)

*To all whom it may concern:*

Be it known that I, WILLIAM EDSON, of Boston, in the county of Suffolk and State of Massachusetts, have invented a new and useful Improvement in Shaker Attachments for Tumblers, &c., of which the following, taken in connection with the accompanying drawings, is a specification.

My invention relates to a device to be used in connection with tumblers or similar vessels when it is desirable to mix fluid or other compounds by shaking, the object being to make a simple cheap combination that may be used in connection with ordinary tumblers to form a complete shaking or mixing device. This object I attain by means of the mechanism shown in the accompanying drawings, in which—

Figure 1:
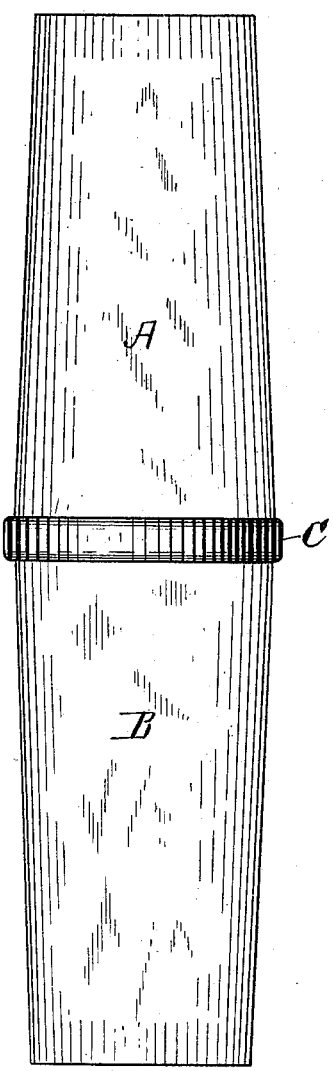
Figure 2:
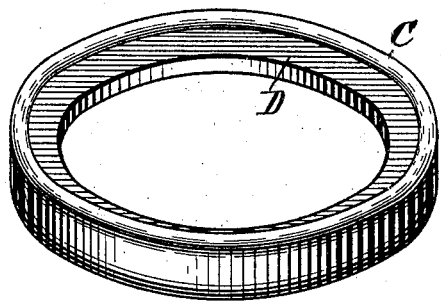
Figure 3:
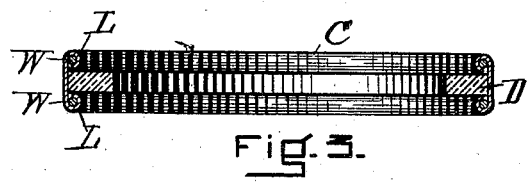
Figure 4:
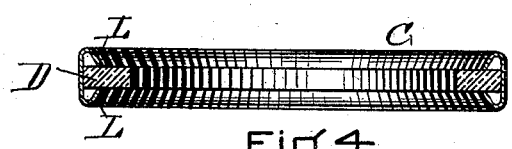
Figure 5:
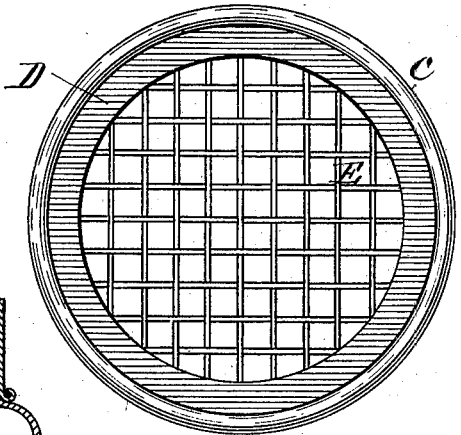
Figure 6:
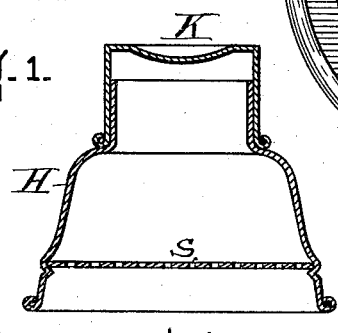

Figure 1 shows in elevation two tumblers having an improved shaker attachment between them. Fig. 2 shows one of the shaker attachments in perspective. Figs. 3 and 4 are sectional views of the same. Fig. 5 is a plan of one of the shaker attachments having a strainer attached. Fig. 6 is a vertical section of a cup or cap that can be used in place of one of the tumblers.

A and B represent two ordinary tumblers, one of which is inverted, having a shaker attachment C between them. The shaker attachment consists of a metallic rim having inturned edges L L, which, if desired, may inclose wires W, or the wires may be omitted, as shown in Fig. 4. The raised edges L L serve the purpose of detachably holding the rubber ring D in place, and they also serve to keep the two tumblers A and B in position while in use.

From the above it may be seen that the shaker consists of two parts, one of which, C, is made of metal so formed as to detachably hold the rubber part D and also to form raised beads L L, which serve to keep the tumblers in place in the action of shaking. The other part, D, is of soft rubber and easily detachable from the rim C, so that as it becomes worn or soiled it can be readily replaced or cleansed. In Fig. 5 a strainer E is shown, which may be used, if desired.

In place of the upper tumbler A a metal top piece H, Fig. 6, may be used. This top piece has a detachable cap K and a strainer S and is so well known as not to need further description.

To use this improved device, the ingredients to be mixed are placed in one of the tumblers—B, for instance. Then the shaker C is placed upon the top of the tumbler and a second tumbler A is inverted and placed as shown in Fig. 1. Now the two tumblers are firmly held together and shaken until the contents are completely mixed and ready for use.

I claim—

In a shaker attachment for tumblers, &c., the combination of a ring having an internal annular groove adapted to detachably hold an elastic packing-ring, and having raised edges adapted to hold the tumblers in place, with a detachable elastic packing-ring; substantially as and for the purpose set forth.

In testimony whereof I have signed my name to this specification, in the presence of two subscribing witnesses, on this 20th day of May, A. D. 1899.

WILLIAM EDSON.

Witnesses:
FRANK G. PARKER,
ANNA C. KINGSBURY.